350-269 SR
10/21/80 OR 4,229,075

United States Patent [19] [11] 4,229,075
Ueda et al. [45] Oct. 21, 1980

[54] ELECTROSTATIC DISPLAY DEVICE

[75] Inventors: Hirotada Ueda, Kobe; Satoshi Ihara, Akashi, both of Japan

[73] Assignees: Displaytek Corporation, Kobe; Daiwa Shinku Corporation, Kakogawa, both of Japan

[21] Appl. No.: 931,438

[22] Filed: Aug. 7, 1978

[30] Foreign Application Priority Data

Aug. 5, 1977 [JP] Japan ................................ 52-93896

[51] Int. Cl.[3] ................................ G02F 1/00

[52] U.S. Cl. ................................ 350/269; 350/285; 350/360

[58] Field of Search ................................ 350/269, 285, 360

[56] References Cited

U.S. PATENT DOCUMENTS 3,897,997 8/1975 Kalt ................................ 350/269
3,989,357 11/1976 Kalt ................................ 350/269

*Primary Examiner*—William L. Sikes
*Attorney, Agent, or Firm*—Wenderoth, Lind & Ponack

[57] ABSTRACT

An electrostatic display device includes an insulative base, a substantially transparent fixed electrode mounted on the base, a substantially transparent dielectric layer such as silicon dioxide applied on the outer surface of the fixed electrode, a resilient sheet electrode fixed at one end thereof to the base and extending therefrom adjacent to the fixed electrode, a means for applying a voltage between the fixed electrode and the sheet electrode, and a display placed on or behind the inner surface of the fixed electrode. When there is no voltage between the fixed and the sheet electrodes, the display is visible through the transparent fixed electrode and the dielectric layer, whereas upon applying a voltage between the fixed and the sheet electrodes, the sheet electrode is attracted to and covers the outer surface of the fixed electrode, thereby concealing the display. The fixed electrode preferably comprises a transparent glass mold having a layer of an electrically conductive material such as stannic oxide chemically vapor-deposited on the outer surface thereof.

16 Claims, 8 Drawing Figures

ELECTROSTATIC DISPLAY DEVICE

BACKGROUND OF THE INVENTION

The present invention relates to an electrostatic display device having a fixed electrode, a resilient sheet electrode, and an insulating layer interposed between the fixed and the sheet electrodes, whereby upon the application of a voltage between the two electrodes, the resilient sheet electrode is attracted to and covers the outer surface of the fixed electrode due to an electrostatic attractive force generated between the electrodes, thus changing the appearance of the device.

The principle employed in such an electrostatic display device is as follows:

The application of a voltage V between the fixed electrode and the sheet electrode with a dielectric layer therebetween produces an electric field between the electrodes, which causes polarization in the dielectric layer. The polarized dielectric layer in turn generates an electrostatic attractive force between the dielectric layer and the fixed electrode and between the dielectric layer and the sheet electrode. Thus, when the electrostatic attractive force is large enough to attract the sheet electrode toward the fixed electrode against the resiliency of the sheet electrode, the sheet electrode covers the outer surface of the fixed electrode, thereby providing a distinct change in the appearance of the device.

The attractive force for attracting the sheet electrode per its unit area is represented as follows:

$$F=CKV/d$$

where, K is the dielectric constant of the dielectric layer;

V is the voltage applied between the electrodes;

d is the thickness of the dielectric layer; and

C is a constant related to the device.

U.S. Pat. No. 3,897,997 to Kalt discloses an electrostatic display device of this type for practical use. Such device, referring to FIG. 8, includes a fixed metal electrode 51 which has a cylindrical outer surface and is fixed to an insulative base 52, and a resilient sheet electrode 54 which is fixed to the base 52 at its one end 53. The sheet electrode 54 is mounted adjacent to the fixed electrode 51 in contact therewith at a portion P. The outer surface of the fixed electrode 51 or the inner surface of the sheet electrode 54, or both, are covered or coated with a thin layer of an insulating material 55 as a dielectric layer.

The sheet electrode 54 consists of, for example, a resilient polymer film 56 as a core of the electrode, such as a polyethylene terephthalate film with an electrically conductive metal like aluminum 57 vapor-deposited thereon.

A d.c. power supply 58 is connected to the fixed electrode 51 and the sheet electrode 54 through lead wires 59 and 60, respectively, so that a d.c. voltage is applicable between the electrodes.

When there is no voltage between the electrodes 51 and 54, the sheet electrode 54 extends straight upwardly because of its resiliency. Thus, the outer surface of the fixed electrode 51 can be seen from above. However, the application of a voltage between the electrodes causes the sheet electrode 54 to be pulled toward the fixed electrode 51 and covers the outer surface thereof in a moment as shown in the double dot chain lines. Now the outer surface of the sheet electrode 54 can be seen from above.

Since the sheet electrode 54 flaps in this way upon applying a voltage between the electrodes 51 and 54, various types of display can be realized when the appearance of the outer surfaces of the two electrodes are different from each other, for example, in their reflectivity, color, patterns and messages they carry.

The above mentioned electrostatic display device is expected to be used in a wide variety of displays since it has many advantages. For example, the device has a memory function as well as a complicated display function. Furthermore, the device requires less power. However, it is also true that the device has some disadvantages.

For example, the above device has a fixed electrode of an opaque material, typically of metal, with a painted layer thereon as an insulating or dielectric layer, so that the flapping of the sheet electrode provides a distinct change in appearance of the device. Therefore, the prior device requires that the painted layer per se has an excellent electrical property.

As is apparent from the previously mentioned formula, when K/d is larger, the sensitivity of the device is better. This means that a thinner layer of paint having a larger dielectric constant should be applied to the fixed electrode. From a practical point of view, the fixed electrode should have such a thin layer of paint that it does not remarkably reduce the attractive force between the two electrodes when a voltage is applied therebetween. Usually, a painted layer of from several to several tens of microns in thickness is applied, and the layer is required to be sufficiently insulative as well as sufficiently durable. Otherwise there will be a possibility, if small, that the sheet electrode in part welds to the fixed electrode. This prevents the sheet electrode from returning to its original position upon the removal of a voltage between the electrodes.

However, a paint or coloring agent which meets such severe requirements is available only with difficulty, and would be very expensive. It will be helpful to apply a thicker layer of paint on the fixed electrode for increasing the insulative property of the layer. But, a thicker layer of paint requires a larger voltage to attract the sheet electrode to the fixed electrode. This reduces the usefulness of the device with respect to power consumption. The application of a higher voltage brings about other disadvantages, and thus is far from a practical application of the device.

SUMMARY OF THE INVENTION

It is, therefore, an object of the invention to obviate the disadvantages involved in the prior device and to provide an electrostatic display device in which a display such as a layer of paint is separated from electrical circuits involved in the device.

Another object of the invention is to provide an electrostatic display device which has a display visible clearly even under strong ambient light or light coming from outside of the device and also under no ambient light on the contrary.

An electrostatic display device of the invention comprises an insulative base, a fixed electrode having a curved outer surface and mounted on the base, the fixed electrode essentially consisting of a transparent material with an electrically conductive transparent layer applied on the outer surface of the transparent material, a dielectric transparent layer applied on the electrically conductive transparent layer, a resilient sheet electrode fixed at one end thereof to the base and extending therefrom adjacent to the fixed electrode so as to come into contact with at least a portion of the dielectric layer, a means for applying a voltage between the fixed electrode and the sheet electrode, and a display placed on or behind the inner surface of the fixed electrode, whereby when there is no voltage between the fixed and the sheet electrode, the display is visible through the transparent fixed electrode whereas upon applying a voltage between the fixed electrode and the sheet electrode, the sheet electrode is attracted to and covers the outer surface of the fixed electrode, thereby concealing the display.

BRIEF DESCRIPTION OF THE DRAWINGS

Other objects and features of the invention will be apparent from the following description with reference to the accompanying drawings, in which.

DETAILED DESCRIPTION OF THE INVENTION

Figure 1:
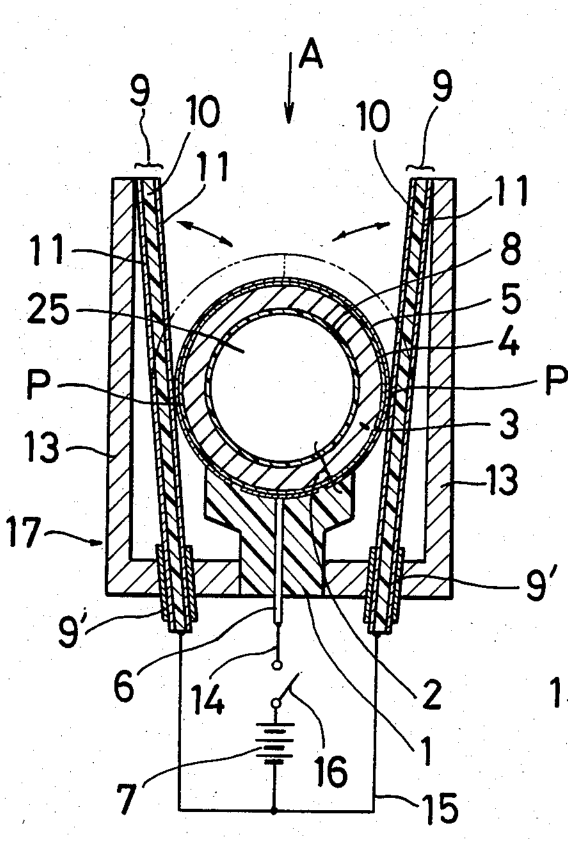
FIG. 1 is a transverse sectional view of an embodiment of the electrostatic display device of the invention.

Referring first to FIG. 1, the device includes a casing 17 having a pair of vertical walls 13 parallel to each other, and an insulative base 1 such as a phenol resin mold mounted at the bottom of the casing 17. On the base 1 is mounted a fixed electrode 2 between the side walls 13. A pair of resilient sheet electrodes 9 are fixed at first ends 9′ thereof to the base 1 on both sides of the fixed electrode 2. Each of the sheet electrodes 9 extends substantially straight upwardly from the base 1 adjacent to the fixed electrode 2 so as to come into contact with a portion of a dielectric layer 5 formed on the fixed electrode 2.

The fixed electrode 2 comprises a transparent glass cylinder 3 with a layer of an electrically conductive transparent material 4 such as stannic oxide ($SnO_2$) and diantimony tetroxide ($Sb_2O_4$) formed on the outer surface of the glass cylinder 3. The dielectric layer 5 comprises a transparent insulative material such as silicon dioxide ($SiO_2$) and is formed on the transparent electrically conductive layer 4. A display 8, or a colored layer of paint in the illustrated embodiment, is applied on the inner surface of the glass cylinder 3 of the fixed electrode 2.

Each resilient sheet electrode 9 is so formed as to extend straight when no voltage is applied between the fixed and the sheet electrodes. Thus, each sheet electrode 9 comprises a resilient polymer film as a core 10 such as polyethylene terephthalate film and polypropylene film, with an electrically conductive metal layer 11, such as of aluminum, silver and gold, vapor-deposited thereon.

If desired, other materials can be used as the core 10 of the sheet electrode 9. For example, the core can be ceramic fibers such as glass fibers and quartz fibers, or so-called "whisker" fibers. Usually, the electrically conductive metal layer of several hundreds of angstroms is formed on the core. Furthermore, the sheet electrode can be a metal foil and a very thin sheet comprising carbon fibers and whisker fibers of several microns or less in thickness.

A lead wire 14 is connected to an electrically conductive member 6 which extends through the base 1 to the fixed electrode 2. Second lead wires 15 are connected to the sheet electrodes 9 at their fixed ends 9′. The lead wires 14 and 15 are in turn connected to a d.c. power supply 7 so that a voltage is applicable between the fixed electrode 2 and the sheet electrodes 9 by turning a switching device 16 on. In the drawing, the power source is a d.c. source, but the supply can be an a.c. power supply.

Thus, when there is no voltage between the fixed electrode 2 and the sheet electrodes 9, each sheet electrode 9 extends straight upwardly from the base 1 because of its resiliency and abuts the side wall 13 at its free end. The display 8 is visible from above through the transparent fixed electrode 2 and the transparent dielectric layer 5. When the switching device 16 is turned on to apply a voltage between the fixed and the sheet electrodes 2 and 9, however, an electric field is produced between the electrodes 2 and 9, as mentioned previously. The intensity of the electric field thus produced is largest at the points P where the sheet electrodes 9 are in contact with the dielectric layer 5 on the fixed electrode 2. Thus, the sheet electrodes 9 near the points P are at first attracted to the fixed electrode 2, and finally the entire lengths of the sheet electrodes, as is shown by the two dot chain lines in FIG. 1, are attracted to the fixed electrode. The sheet electrodes 9 are attracted to and cover the outer surface of the fixed electrode 2 in a moment, however, thereby the display 8 is concealed by the sheet electrodes 9 and the outer surfaces of the sheet electrodes 9 are in turn visible from above.

In this manner, the appearance of the device visible from above is distinctly changed through the on and off operation of the switching device 16.

It is to be noted here that while the switching device is turned on, no electric power is consumed since the dielectric layer 5 is interposed between the fixed and the sheet electrodes 2 and 9.

It is further to be noted that the display 8 is separated from the electric circuits involved in the device. Therefore, the display 8, for example, a layer of paint can be chosen independently of its electrical properties, in particular its insulative property.

In general, the fixed electrode 2 comprises a transparent mold having an electrically conductive film or layer formed thereon. The transparent material for the mold herein includes not only colored and colorless glass and synthetic resins but also semitransparent materials such as opal and foamed materials. For example, the fixed electrode 2 comprises a glass mold with a thin layer of stannic oxide of about several microns deposited thereon by a chemical vapor deposition process in which stannic oxide is produced according to the following formula:

$$SnCl_4 + O_2 \rightarrow SnO_2 + 2Cl_2$$

The fixed electrode 2 alternatively comprises a mold of transparent glass or synthetic resins such as acrylic resin, polycarbonate, polystyrene and polyvinylchloride with a metal layer such as silver, gold and aluminum vapor-deposited thereon to a thickness of from several tens to several hundreds of angstroms.

The fixed electrode 2 further can be a transparent glass or synthetic resin having electrically conductive minute powders uniformly dispersed therein.

The dielectric layer 5 can be formed either on the fixed electrode 2 as previously mentioned with reference to FIG. 1, or on the resilient sheet electrode 9. The former manner is preferred from the point of view of manufacturing the electrodes. Typical examples of the dielectrics used in the invention are silicon dioxide, titanium dioxide ($TiO_2$), zirconium dioxide ($ZrO_2$) and yttrium oxide ($Y_2O_3$). In addition to the above oxides of metals, other inorganic compounds can be also used as a dielectric, among which are metal halogenides such as calcium fluoride ($CaF_2$) and magnesium fluoride ($MgF_2$), nitrides such as silicon nitrides and aluminum nitrides, and ferroelectric substances such as barium metatitanate ($BaTiO_3$). The dielectric layer is preferably formed on the outer surface of the fixed electrode 2 through, for example, vapor-deposition, chemical vapor deposition or sputtering. The dielectric layer is preferably several microns in thickness.

Most preferably, the fixed electrode 2 comprises a glass mold having an electrically conductive layer of stannic oxide, and has applied thereon silicon dioxide as a dielectric layer 5, and also the sheet electrode 9 comprises a polyethylene terephthalate film of about eight microns in thickness as a core having on opposite sides thereof thin layers of aluminum at a thickness of several hundreds of angstroms.

In a modified embodiment of the invention, however, the dielectric layer is formed on the sheet electrode 9. For example, the sheet electrode is formed of a metal foil, on which a layer of a synthetic resin is applied as the dielectric layer.

According to the invention, the display 8 is placed on or behind the inner face of the fixed electrode 2. For example, a colored layer of paint is applied on the inner face of the fixed electrode. Alternatively, a display is put in a hollow 25 provided in the transparent fixed electrode or behind the fixed electrode. Displays suitable for positioning in this manner are, for example, a paint-colored body, a reflective body having a vapor-deposited metal layer thereon, a discharge tube such as a fluorescent lamp and a neon lamp, a luminescent diode, an electroluminescent body and other luminous bodies. The display 8 put in the hollow or behind the fixed electrode can be replaced with other displays in a simple manner when necessary, for example, when the display is damaged or deteriorated.

FIGS. 2 to 7 show other embodiments of the electrostatic display device of the invention, wherein like reference numerals designate parts corresponding to those in FIG. 1.

Figure 2:
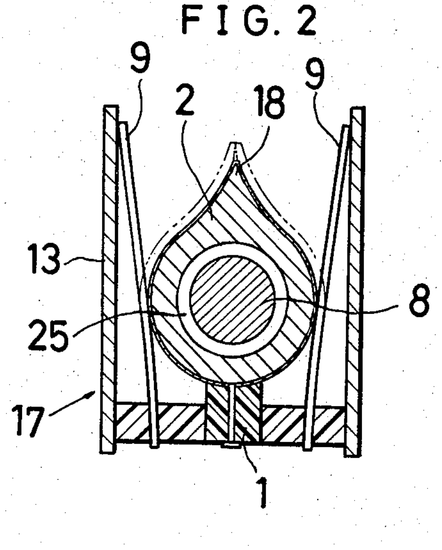
FIGS. 2 to 7 are transverse sectional views of other embodiments of the invention.

In the embodiment shown in FIG. 2, the fixed electrode 2 comprises a transparent synthetic resin mold having a transverse section configured like a Welsh onion flower and a hollow 25 therein. A pair of the sheet electrodes 9 are mounted on the insulative base 1 in the same manner as in FIG. 1. In the hollow 25 of the fixed electrode 2 is put a reflective body with a vapor-deposited metal layer thereon as the display 8. The fixed electrode 2 has a ridge 18 extending axially on the uppermost portion of the fixed electrode so that the outer surface of the fixed electrode is completely covered with the sheet electrodes 9 upon the application of a voltage between the fixed and the sheet electrodes 2 and 9, as shown by the two dot chain lines. In somewhat more detail, the sheet electrodes abut each other at their free ends to completely conceal the fixed electrode when the sheet electrodes are attracted thereto. When the fixed electrode is flat at the uppermost portion, however, there will remain a possibility that a spacing is left between the free ends of the sheet electrodes, thus forming a slit therebetween, and the fixed electrode is visible through the slit.

On removing the voltage between the fixed electrode and the sheet electrode, the sheet electrodes extend straight upwardly and disclose the fixed electrode.

Figure 3:
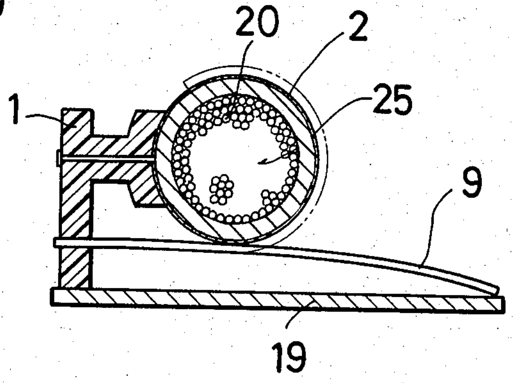

The embodiment of FIG. 3 includes the fixed electrode 2 in the form of a transparent cylinder filled with glass beads 20 as the display in the hollow 25 provided in the fixed electrode. The sheet electrode 9 is fixed to the base 1 adjacent to the fixed electrode so as to extend substantially horizontally. Upon applying a voltage between the electrodes 2 and 9, the sheet electrode 9 winds and covers the outer surface of the fixed electrode 2. In this device, the glass beads 25 reflecting the ambient light or illuminated by a light source such as a lamp (not shown) are visible as the display when there is no voltage between the electrodes.

Figure 4:
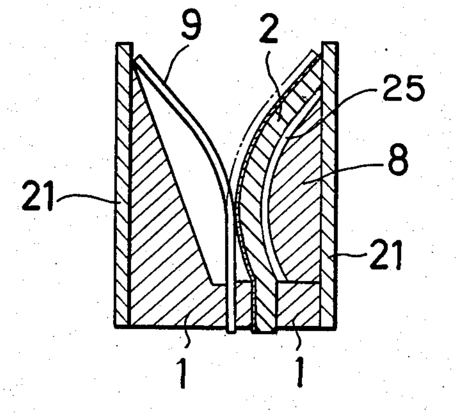

In the embodiment shown in FIG. 4, the fixed electrode 2 has a curved surface and is fixed on the base 1 and a first of a pair of supports 21. The fixed electrode 2 has a hollow 25 in which a luminescent body is contained as the display. The sheet electrode 9 also is fixed to the base 1 adjacent to the fixed electrode and extends upwardly therefrom so that the free end thereof abuts another support 21. The sheet electrode has applied on both sides thereof reflective metal layers. Thus, when there is no voltage between the fixed and the sheet electrodes, the sheet electrode extends straight and the luminous body is visible from above. The sheet electrode reflects light from the luminous body and is also visible.

Figure 5:
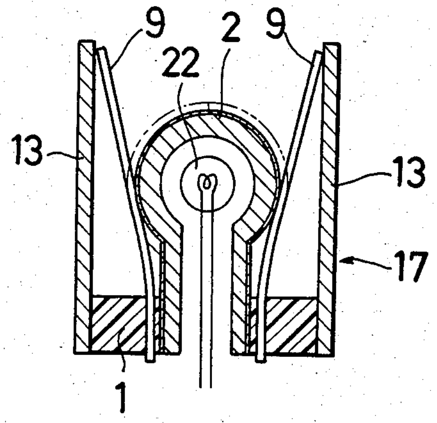

FIG. 5 shows a further embodiment of the invention, wherein the fixed electrode 2 and the sheet electrodes 9 are fixed to the base 1 in the same manner as in FIG. 1. A lamp 22 is placed behind the transparent fixed electrode 2 to illuminate the electrode 2 from behind. Thus, when no voltage exists between the electrodes 2 and 9, the light emitted by the lamp 22 is visible through the fixed electrode 2. When a voltage is applied between the electrodes, the sheet electrodes 9 cover the outer surface of the fixed electrode 2, thereby blocking the light.

Figure 6:
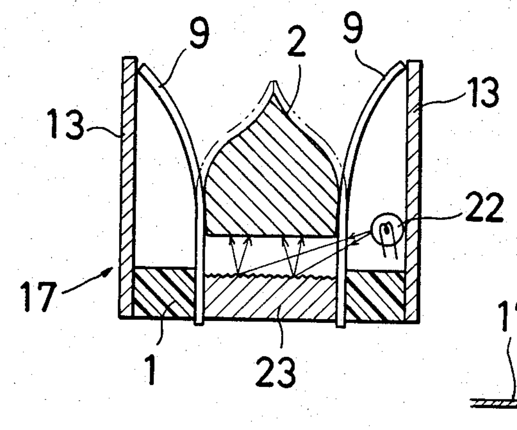

FIG. 6 shows a still further embodiment of the invention. A diffused reflective body 23 is put below the transparent fixed electrode 2 and is illuminated by a lamp 22 so that the diffused light is visible through the fixed electrode when there is no voltage between the electrodes 2 and 9.

Figure 7:
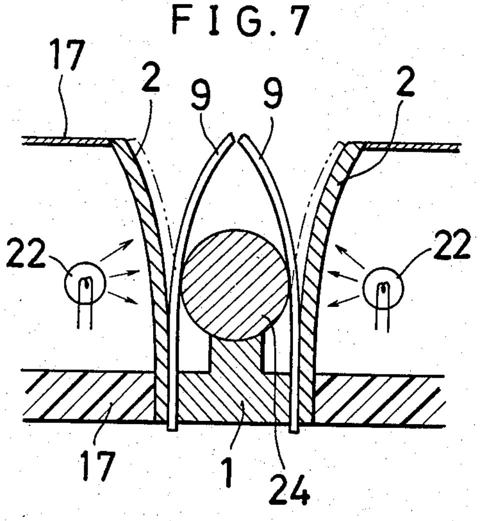
Figure 8:
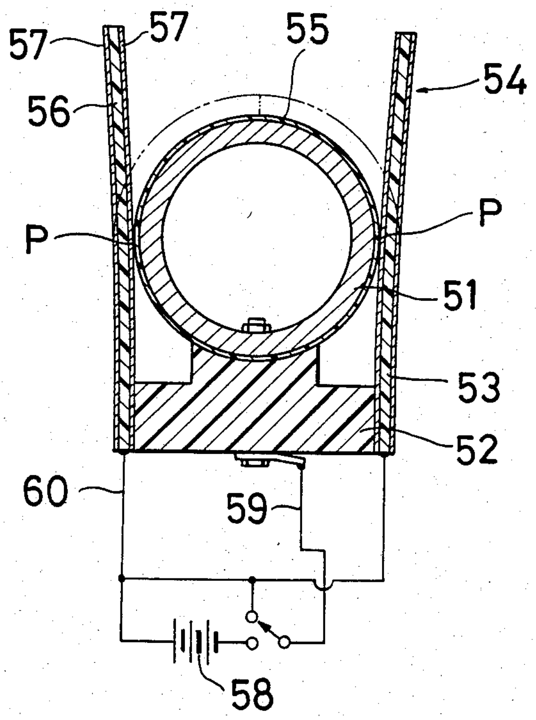
FIG. 8 PRIOR ART
FIG. 8 is a transverse sectional view of a prior art device.

FIG. 7 shows a modified embodiment according to the invention which comprises a pair of sheet electrodes 9, and a pair of fixed electrodes 2. The pair of sheet electrodes 9 are fixed on the insulative base 1 so as to extend upwardly and are supported by an insulative support 24 mounted therebetween on the base 1 when no voltage exists between the fixed and the sheet electrodes 2 and 9. Outside of each sheet electrode is a respective fixed electrode 2 which is fixed to the base 1 adjacent the respective sheet electrode so as to leave a space therebetween at the upper portion thereof and so as to be in contact with the sheet electrode at the lower portion thereof. A lamp 22 is placed behind each of the fixed electrodes 2. Thus, when no voltage exists between the fixed and the sheet electrodes, the illuminated fixed electrodes are visible from above, and when a voltage is applied between the electrodes, the sheet electrodes cover the fixed electrodes, thereby blocking the light.

According to the electrostatic display device, as above mentioned, the fixed electrode is substantially transparent and the display is mounted on or behind the inner surface of the fixed electrode. The display is not required to serve as the dielectric layer. In other words, the display is separated from the electrical circuits involved in the device.

Therefore, according to the invention, inorganic insulative materials such as silicon dioxide can be used as the dielectric, instead of a colored layer of paint which has conventionally been used both as the dielectric and the display. As will be apparent, an inorganic dielectric has advantages over a colored layer of paint in that the inorganic dielectric is more insulative, voltage-withstanding, weather-resistant and durable. Thus, the display can be chosen independently from its electrical properties. This removes various restrictions on the display and permits a wider application of the device.

What is claimed is:

1. An electrostatic display device comprising:

an insulative base;

a substantially transparent fixed electrode mounted on the base, said fixed electrode being constructed of an electrically conductive transparent material, said fixed electrode having inner and outer surfaces;

a substantially transparent dielectric layer applied on said outer surface of said fixed electrode;

at least one resilient sheet electrode fixed at one end thereof to the base and extending therefrom adjacent to the fixed electrode;

a means for applying a voltage between the fixed electrode and the resilient sheet electrode; and a display placed on or behind said inner surface of the fixed electrode;

whereby when there is no voltage between the fixed electrode and the sheet electrode, the display is visible through the substantially transparent fixed electrode and the substantially transparent dielectric layer thereon, whereas upon applying a voltage between the fixed electrode and the sheet electrode, the sheet electrode is attracted to and covers the outer surface of the fixed electrode, thereby concealing the display.

2. An electrostatic display device as claimed in claim 1, wherein the fixed electrode comprises a substantially transparent material with a substantially transparent electrically conductive material uniformly dispersed therein.

3. An electrostatic display device as claimed in claim 1, wherein the fixed electrode comprises a substantially transparent glass mold with a substantially transparent electrically conductive powder uniformly dispersed therein.

4. An electrostatic display device as claimed in claim 1, wherein the fixed electrode comprises a substantially transparent synthetic resin mold with a substantially transparent electrically conductive powder uniformly dispersed therein.

5. An electrostatic display device as claimed in claim 1, wherein the dielectric layer comprises silicon dioxide.

6. An electrostatic display device as claimed in claim 1, wherein the resilient sheet electrode comprises a polymer film having a thin layer of a metal deposited on opposite sides thereof.

7. An electrostatic display device as claimed in claim 6, wherein the polymer film is a polyethylene terephthalate film.

8. An electrostatic display device as claimed in claim 6, wherein the metal is aluminum.

9. An electrostatic display device as claimed in claim 1, wherein the sheet electrode is a thin film of a metal having on opposite sides thereof thin layers of a synthetic resin.

10. An electrostatic display device as claimed in claim 1, wherein the display is a colored layer of paint applied on the inner surface of the fixed electrode.

11. An electrostatic display device as claimed in claim 1, wherein the display is a reflective layer of a metal deposited on the inner surface of the fixed electrode.

12. An electrostatic display device as claimed in claim 1, wherein the display is removably placed on or behind the inner surface of the fixed electrode.

13. An electrostatic display device as claimed in claim 12, wherein the display is a reflective member.

14. An electrostatic display device as claimed in claim 12, wherein the display is a luminous member.

15. An electrostatic display device as claimed in claim 12, wherein the display is a diffused reflective member.

16. An electrostatic display device as claimed in claim 1, wherein the fixed electrode has therein a hollow in which the display is removably placed.

* * * * *